No. 673,523.  
C. JOHNSON & S. GARNETT.  
DANDY ROLL FOR PAPER MAKING MACHINES.  
(Application filed June 23, 1899.)  
Patented May 7, 1901.
(No Model.)
Fig. 1.
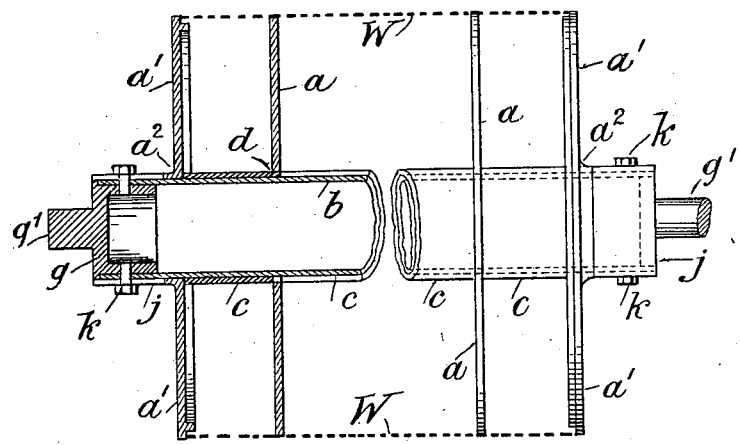
Fig. 2. 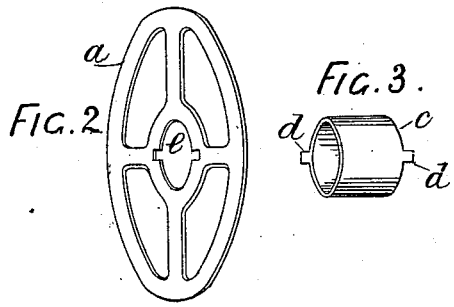 Fig. 3.
WITNESSES:
F. W. Wright
S. C. Connor
INVENTORS
CHARLES JOHNSON
SMITH GARNETT
BY Howson and Howson
THEIR ATTORNEYS.

UNITED STATES PATENT OFFICE.

CHARLES JOHNSON AND SMITH GARNETT, OF MANCHESTER, ENGLAND.

DANDY-ROLL FOR PAPER-MAKING MACHINES.

SPECIFICATION forming part of Letters Patent No. 673,523, dated May 7, 1901.

Application filed June 23, 1899. Serial No. 721,634. (No model.)

*To all whom it may concern:*

Be it known that we, CHARLES JOHNSON and SMITH GARNETT, subjects of the Queen of Great Britain, residing at Manchester, in the county of Lancaster, England, have invented new and useful Improvements in Dandy-Rolls for Paper-Making Machines, of which the following is a specification.

This invention relates to an improvement in the construction of dandy-rolls such as are employed in paper-making machines for putting water-mark or the finish on paper.

The primary object of our invention is to enable the rings which form the frame of the dandy-roll and over which the wire-cloth is placed to be secured to the tube or shaft without the necessity of soldering or brazing said rings to the tube or shaft, and thereby to facilitate the removal and replacement of any intermediate wheel or wheels, if necessary; also, to attain a greater degree of rigidity than is obtainable in the present construction of dandy-rolls.

In the accompanying drawings, Figure 1 is a part section and a part side view of our improved dandy-roll. Figs. 2 and 3 are perspective detail views of the rings and ferrules, respectively, used in our roll.

In the views similar letters refer to similar parts.

According to this invention, for the purpose of securing the rings $a$ to the transverse tube or shaft $b$ without soldering or brazing the said rings thereto, we employ ferrules as distance-pieces and supports to the rings on which the wire-cloth W is mounted. We form the ferrules $c$ with a lug or lugs $d$ to slide into corresponding grooves or keyways $e$ in the bearings of the rings $a$ when placed on the shaft $b$.

In building a dandy-roll in accordance with this invention we fit in the end of the tube $b$ a plug $g$, that is formed with a bearing pin or journal $g'$, and place a ferrule $j$ on the outside of the end portion of the tube, said ferrule and plug being secured thereto by studs or screws $k$. We then slip onto the shaft the end ring $a'$, which is flanged and of the ordinary form, the central flanged portion $a^2$ abutting against the edge of the aforesaid fixed ferrule $j$. A ferrule, as $c$, is then put on and a ring $a$, the lug $d$ on the ferrule entering the groove or keyway $e$ in the ring. A ferrule and a ring are then put on the shaft alternately until the length of the roll that is required is obtained, when it is completed with a flanged ring $a'$, a fixed ferrule $j$, and a plug $g$, as at the commencement. In order to obtain increased grip on the shaft, it is obvious that these ferrules may be split longitudinally, if desired. By these means as the rings do not require to be soldered or brazed said rings and also the ferrules, the shaft, and other parts of the roll may be made of aluminium. A dandy-roll can thus be produced that is lighter than a roll of the ordinary construction, and a manufacturer may, if he prefers, use a roll of larger diameter on fast-running machines, and thereby diminish the liability of frothing. If an intermediate ring should require to be renewed or the space between the rings to be altered, the said rings and ferrules may be readily slipped off the shaft and replaced or changed.

We claim as our invention—

In a paper-making machine, a dandy-roll consisting of a cylindrical shaft with rings or wheels fitted thereto, said rings or wheels having recesses in their bearings, and ferrules on the said shaft alternating with the said rings or wheels, and having lugs corresponding to and fitting in said recesses, and wire-cloth upon the rings or wheels with end clamping means for clamping the rings or wheels and ferrules together, whereby the ferrules form both distance-pieces and supports, substantially as described.

In testimony whereof we have signed our names to this specification in the presence of two subscribing witnesses.

CHARLES JOHNSON.
    SMITH GARNETT.

Witnesses:
 JNO. HUGHES,
 J. ERNEST HUGHES.